(12) United States Patent
Nair et al.

(10) Patent No.: US 8,612,570 B1
(45) Date of Patent: Dec. 17, 2013

(54) DATA CLASSIFICATION AND MANAGEMENT USING TAP NETWORK ARCHITECTURE

(75) Inventors: Manoj Nair, Cary, NC (US); Stephen R. Perrin, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 1141 days.

(21) Appl. No.: 11/772,192

(22) Filed: Jun. 30, 2007

Related U.S. Application Data

(63) Continuation-in-part of application No. 11/528,900, filed on Sep. 27, 2006, now Pat. No. 7,640,345.

(60) Provisional application No. 60/826,072, filed on Sep. 18, 2006.

(51) Int. Cl.
*G06F 15/173* (2006.01)

(52) U.S. Cl.
USPC .......................................................... 709/224

(58) Field of Classification Search
USPC .................................................. 709/223, 224
See application file for complete search history.

(56) References Cited

U.S. PATENT DOCUMENTS

| | | | |
|---|---|---|---|
| 6,003,040 A | 12/1999 | Mital et al. |
| 6,167,445 A | 12/2000 | Gai et al. |
| 6,308,216 B1 | 10/2001 | Goldszmidt et al. |
| 6,349,297 B1 | 2/2002 | Shaw et al. |
| 6,363,053 B1 | 3/2002 | Schuster et al. |
| 6,430,613 B1 | 8/2002 | Brunet et al. |
| 6,591,300 B1 | 7/2003 | Yurkovic |
| 6,633,312 B1 | 10/2003 | Rochford et al. |
| 6,865,728 B1 | 3/2005 | Branson et al. |
| 7,185,073 B1 | 2/2007 | Gai et al. |
| 7,240,076 B2 | 7/2007 | McCauley et al. |
| 7,278,156 B2 | 10/2007 | Mei et al. |
| 7,363,292 B2 | 4/2008 | Chaboche |
| 7,543,020 B2 | 6/2009 | Walker et al. |
| 7,548,915 B2 | 6/2009 | Ramer et al. |
| 7,580,357 B2 | 8/2009 | Chang et al. |
| 7,613,806 B2 | 11/2009 | Wright et al. |
| 7,616,642 B2 | 11/2009 | Anke et al. |
| 7,725,570 B1 | 5/2010 | Lewis |
| 7,725,571 B1 | 5/2010 | Lewis |
| 7,730,172 B1 | 6/2010 | Lewis |
| 7,734,765 B2 | 6/2010 | Musman et al. |
| 7,739,239 B1 | 6/2010 | Cormie et al. |
| 7,895,220 B2 | 2/2011 | Evans et al. |

(Continued)

FOREIGN PATENT DOCUMENTS

WO  WO 2008/036621  3/2008

OTHER PUBLICATIONS

U.S. Appl. No. 11/692,051, filed Mar. 27, 2007, Perrin et al.
U.S. Appl. No. 11/692,508, filed Mar. 27, 2007, Perrin et al.

(Continued)

*Primary Examiner* — Scott Christensen
(74) *Attorney, Agent, or Firm* — Workman Nydegger

(57) ABSTRACT

In a networked computer system, a method and system for classifying and managing the data objects in a data signal in a computer system comprising using a network tap to tap the data signal transmitted between two devices in the system, collecting information about the data objects in the data signal, classifying the data objects to assign categories based on the collected information about the data object, and storing the results of the classification.

20 Claims, 6 Drawing Sheets

(56) References Cited

U.S. PATENT DOCUMENTS

| | | |
|---|---|---|
| 7,953,740 B1 | 5/2011 | Vadon et al. |
| 8,104,080 B2 | 1/2012 | Burns et al. |
| 2002/0016800 A1 | 2/2002 | Spivak et al. |
| 2002/0091746 A1 | 7/2002 | Umberger et al. |
| 2002/0161883 A1 | 10/2002 | Matheny et al. |
| 2003/0023587 A1 | 1/2003 | Dennis et al. |
| 2003/0023712 A1 | 1/2003 | Zhao et al. |
| 2003/0036886 A1 | 2/2003 | Stone |
| 2003/0041050 A1 | 2/2003 | Smith et al. |
| 2003/0093528 A1 | 5/2003 | Rolia |
| 2003/0140009 A1 | 7/2003 | Namba et al. |
| 2003/0167180 A1 | 9/2003 | Chung et al. |
| 2003/0196108 A1 | 10/2003 | Kung |
| 2003/0212778 A1 | 11/2003 | Collomb |
| 2003/0225829 A1 | 12/2003 | Pena et al. |
| 2003/0233391 A1 | 12/2003 | Crawford et al. |
| 2003/0233464 A1 | 12/2003 | Walpole et al. |
| 2003/0236904 A1 | 12/2003 | Walpole et al. |
| 2004/0060002 A1 | 3/2004 | Lucovsky et al. |
| 2004/0098415 A1 | 5/2004 | Bone et al. |
| 2004/0215650 A1 | 10/2004 | Shaji et al. |
| 2004/0243699 A1 | 12/2004 | Koclanes et al. |
| 2005/0060662 A1 | 3/2005 | Soares et al. |
| 2005/0071182 A1 | 3/2005 | Aikens et al. |
| 2005/0125768 A1 | 6/2005 | Wong et al. |
| 2005/0131982 A1 | 6/2005 | Yamasaki et al. |
| 2005/0132034 A1* | 6/2005 | Iglesia et al. ............ 709/223 |
| 2005/0177545 A1 | 8/2005 | Buco et al. |
| 2005/0197852 A1 | 9/2005 | Gebhard et al. |
| 2005/0251533 A1 | 11/2005 | Harken et al. |
| 2005/0262097 A1 | 11/2005 | Sim-Tang et al. |
| 2005/0273451 A1 | 12/2005 | Clark et al. |
| 2006/0015388 A1 | 1/2006 | Flockhart et al. |
| 2006/0036463 A1 | 2/2006 | Patrick et al. |
| 2006/0092861 A1 | 5/2006 | Corday et al. |
| 2006/0095543 A1 | 5/2006 | Ito et al. |
| 2006/0101084 A1 | 5/2006 | Kishi et al. |
| 2006/0106782 A1 | 5/2006 | Blumenau et al. |
| 2006/0112108 A1 | 5/2006 | Eklund et al. |
| 2006/0114832 A1 | 6/2006 | Hamilton et al. |
| 2006/0129974 A1 | 6/2006 | Brendle et al. |
| 2006/0179143 A1 | 8/2006 | Walker et al. |
| 2006/0236061 A1 | 10/2006 | Koclanes |
| 2006/0248165 A1 | 11/2006 | Sridhar et al. |
| 2006/0248187 A1 | 11/2006 | Thorpe et al. |
| 2007/0038683 A1 | 2/2007 | Dixon et al. |
| 2007/0055689 A1 | 3/2007 | Rhoads et al. |
| 2007/0058632 A1 | 3/2007 | Back et al. |
| 2007/0061363 A1 | 3/2007 | Ramer et al. |
| 2007/0070894 A1 | 3/2007 | Wang et al. |
| 2007/0083875 A1 | 4/2007 | Jennings |
| 2007/0103984 A1 | 5/2007 | Kavuri et al. |
| 2007/0104208 A1 | 5/2007 | Svensson |
| 2007/0127370 A1 | 6/2007 | Chang et al. |
| 2007/0153802 A1 | 7/2007 | Anke et al. |
| 2007/0192352 A1 | 8/2007 | Levy |
| 2007/0208751 A1 | 9/2007 | Cowan et al. |
| 2007/0214208 A1 | 9/2007 | Balachandran |
| 2007/0226228 A1 | 9/2007 | Her et al. |
| 2007/0294406 A1 | 12/2007 | Suer et al. |
| 2007/0299828 A1 | 12/2007 | Lewis et al. |
| 2008/0002678 A1 | 1/2008 | Klessig et al. |
| 2008/0005086 A1 | 1/2008 | Moore |
| 2008/0021850 A1 | 1/2008 | Irle et al. |
| 2008/0049642 A1 | 2/2008 | Gudipudi et al. |
| 2008/0059387 A1 | 3/2008 | Vaidhyanathan et al. |
| 2008/0071726 A1 | 3/2008 | Nair et al. |
| 2008/0071727 A1 | 3/2008 | Nair et al. |
| 2008/0071813 A1 | 3/2008 | Nair et al. |
| 2008/0071908 A1 | 3/2008 | Nair et al. |
| 2008/0077682 A1 | 3/2008 | Nair et al. |
| 2008/0077995 A1 | 3/2008 | Curnyn |
| 2008/0097923 A1 | 4/2008 | Kim et al. |
| 2008/0114725 A1 | 5/2008 | Indeck et al. |
| 2008/0134043 A1 | 6/2008 | Georgis et al. |
| 2008/0177994 A1 | 7/2008 | Mayer |
| 2008/0301760 A1 | 12/2008 | Lim |
| 2009/0077210 A1 | 3/2009 | Musman et al. |
| 2009/0150431 A1 | 6/2009 | Schmidt et al. |
| 2009/0157881 A1 | 6/2009 | Kavuri et al. |

OTHER PUBLICATIONS

U.S. Appl. No. 11/694,753, filed Mar. 30, 2007, Nair et al.
U.S. Appl. No. 11/694,764, filed Mar. 30, 2007, Nair et al.
U.S. Appl. No. 11/694,783, filed Mar. 30, 2007, Perrin et al.
U.S. Appl. No. 11/772,719, filed Jun. 30, 2007, Bell II.
U.S. Appl. No. 11/528,900, Jun. 9, 2008, Office Action.
U.S. Appl. No. 11/528,772, Sep. 12, 2008, Pre-Interview First Office Action.
U.S. Appl. No. 11/528,783, Nov. 7, 2008, Pre-Interview First Office Action.
U.S. Appl. No. 11/528,898, Sep. 5, 2008, Pre-Interview First Office Action.
U.S. Appl. No. 11/528,783, Feb. 24, 2009, Office Action.
U.S. Appl. No. 11/528,898, Feb. 9, 2009, First Action Interview.
U.S. Appl. No. 11/528,898, Apr. 3, 2009, Office Action.
U.S. Appl. No. 11/528,900, Jan. 23, 2009, Final Office Action.
U.S. Appl. No. 11/694,753, Mar. 25, 2009, Office Action.
U.S. Appl. No. 11/694,783, Feb. 6, 2009, Office Action.
U.S. Appl. No. 11/528,772, Jun. 3, 2009, Final Office Action.
U.S. Appl. No. 11/528,783, Jun. 25, 2009, Final Office Action.
U.S. Appl. No. 11/528,900, Aug. 25, 2009, Notice of Allowance.
U.S. Appl. No. 11/692,058, Jul. 9, 2009, Office Action.
U.S. Appl. No. 11/692,051, Aug. 26, 2009, Office Action.
U.S. Appl. No. 11/772,179, Aug. 19, 2009, Office Action.
U.S. Appl. No. 11/528,898, Oct. 7, 2009, Final Office Action.
U.S. Appl. No. 11/694,753, Nov. 18, 2009, Final Office Action.
U.S. Appl. No. 11/864,596, filed Sep. 28, 2007, Nair et al.
U.S. Appl. No. 11/864,605, filed Sep. 28, 2007, Nair et al.
U.S. Appl. No. 11/864,770, filed Sep. 28, 2007, Nair et al.
U.S. Appl. No. 11/864,774, filed Sep. 28, 2007, Nair et al.
U.S. Appl. No. 11/864,760, filed Sep. 28, 2007, Nair et al.
U.S. Appl. No. 11/864,764, filed Sep. 28, 2007, Nair et al.
U.S. Appl. No. 11/528,783, Jan. 15, 2010, Office Action.
U.S. Appl. No. 11/692,058, Jan. 8, 2010, Final Office Action.
U.S. Appl. No. 11/864,596, Nov. 12, 2009, Office Action.
U.S. Appl. No. 11/864,770, Nov. 27, 2009, Office Action.
U.S. Appl. No. 11/864,760, Nov. 24, 2009, Office Action.
U.S. Appl. No. 11/864,605, Jan. 14, 2010, Office Action.
U.S. Appl. No. 11/528,772, Aug. 10, 2010, Final Office Action.
U.S. Appl. No. 11/528,790, Jul. 12, 2010, Office Action.
U.S. Appl. No. 11/692,058, Jul. 6, 2010, Office Action.
U.S. Appl. No. 11/694,764, Aug. 4, 2010, Final Office Action.
U.S. Appl. No. 11/864,596, May 26, 2010, Final Office Action.
U.S. Appl. No. 11/864,605, May 28, 2010, Final Office Action.
U.S. Appl. No. 11/864,760, Jul. 27, 2010, Office Action.
U.S. Appl. No. 11/528,772, Jan. 28, 2010, Office Action.
U.S. Appl. No. 11/694,753, Mar. 29, 2010, Office Action.
U.S. Appl. No. 11/692,051, Feb. 19, 2010, Notice of Allowance.
U.S. Appl. No. 11/692,051, Mar. 31, 2010, Notice of Allowance.
U.S. Appl. No. 11/694,764, Jan. 28, 2010, Office Action.
U.S. Appl. No. 11/772,179, Feb. 23, 2010, Final Office Action.
U.S. Appl. No. 11/864,770, Apr. 21, 2010, Final Office Action.
U.S. Appl. No. 11/864,760, Apr. 7, 2010, Final Office Action.
U.S. Appl. No. 11/694,753, Jun. 17, 2011, Final Office Action.
U.S. Appl. No. 11/694,764, Mar. 17, 2011, Office Action.
U.S. Appl. No. 11/864,596, Mar. 11, 2011, Office Action.
U.S. Appl. No. 11/864,605, Mar. 9, 2011, Final Office Action.
U.S. Appl. No. 11/864,770, Apr. 19, 2011, Final Office Action.
U.S. Appl. No. 11/864,774, May 11, 2011, Office Action.
U.S. Appl. No. 11/528,783, Sep. 1, 2010, Final Office Action.
U.S. Appl. No. 11/528,790, Jan. 13, 2011, Final Office Action.
U.S. Appl. No. 11/692,058, Jan. 24, 2011, Notice of Allowance.
U.S. Appl. No. 11/694,753, Oct. 5, 2010, Final Office Action.
U.S. Appl. No. 11/694,753, Jan. 19, 2011, Office Action.
U.S. Appl. No. 11/864,605, Nov. 4, 2010, Office Action.
U.S. Appl. No. 11/864,760, Jan. 27, 2011, Final Office Action.

(56) References Cited

OTHER PUBLICATIONS

U.S. Appl. No. 11/864,770, Nov. 3, 2010, Office Action.
U.S. Appl. No. 11/864,764, Jan. 27, 2011, Office Action.
U.S. Appl. No. 13/414,512, filed Mar. 7, 2012, Nair et al.
U.S. Appl. No. 11/528,772, Oct. 27, 2011, Notice of Allowance.
U.S. Appl. No. 11/528,783, Feb. 14, 2012, Office Action.
U.S. Appl. No. 11/528,790, Jan. 23, 2012, Office Action.
U.S. Appl. No. 11/528,898, Mar. 1, 2012, Office Action.
U.S. Appl. No. 11/694,753, Jan. 26, 2012, Office Action.
U.S. Appl. No. 11/694,764, Sep. 26, 2011, Final Office Action.
U.S. Appl. No. 11/772,179, Mar. 29, 2012, Office Action.
U.S. Appl. No. 11/864,596, Oct. 7, 2011, Final Office Action.
U.S. Appl. No. 11/864,764, Aug. 29, 2011, Final Office Action.
U.S. Appl. No. 11/864,764, May 3, 2012, Office Action.
U.S. Appl. No. 11/864,774, Dec. 9, 2011, Final Office Action.
U.S. Appl. No. 11/528,783, Aug. 15, 2012, Final Office Action.
U.S. Appl. No. 11/528,790, Jul. 18, 2012, Final Office Action.
U.S. Appl. No. 11/694,753, Nov. 30, 2012, Notice of Allowance.
U.S. Appl. No. 11/694,764, Aug. 1, 2012, Office Action.
U.S. Appl. No. 11/864,605, Jul. 3, 2012, Office Action.
U.S. Appl. No. 11/528,898, Oct. 2, 2012, Final Office Action.
U.S. Appl. No. 11/694,753, Aug. 31, 2012, Notice of Allowance.
U.S. Appl. No. 11/694,764, Nov. 29, 2012, Final Office Action.
U.S. Appl. No. 11/772,179, Nov. 13, 2012, Final Office Action.
U.S. Appl. No. 11/864,605, Nov. 8, 2012, Final Office Action.
U.S. Appl. No. 11/864,770, Feb. 4, 2013, Office Action.
U.S. Appl. No. 11/864,764, Dec. 10, 2012, Final Office Action.
Ben-Ghorbel-Talbi et al.; "An Extended Role-Based Access Control Model for Delegating Obligations"; Springer-Verlag Berline Heidelberg 2009.
Belokosztolszki et al.; "Meta-Policies for Distributed Role-Based Access Control Systems"; 2002 IEEE.
U.S. Appl. No. 11/528,790, Jun. 17, 2013, Office Action.
U.S. Appl. No. 11/694,764, May 21, 2013, Notice of Allowance.
U.S. Appl. No. 11/864,605, May 24, 2013, Notice of Allowance.
U.S. Appl. No. 11/864,770, Jun. 13, 2013, Final Office Action.
U.S. Appl. No. 11/864,774, Apr. 15, 2013, Notice of Allowance.
U.S. Appl. No. 13/414,512, Aug. 1, 2013, Office Action.

* cited by examiner

DATA CLASSIFICATION AND MANAGEMENT USING TAP NETWORK ARCHITECTURE

CROSS-REFERENCE TO RELATED APPLICATIONS

This application is a continuation-in-part of U.S. patent application Ser. No. 11/528,900, filed Sep. 27, 2006 and entitled "INFORMATION MANAGEMENT", which claims the benefit of U.S. Provisional Application Ser. No. 60/826,072, filed Sep. 18, 2006 and entitled "INFORMATION MANAGEMENT". The foregoing applications are incorporated herein by reference in its entirety.

BACKGROUND OF THE INVENTION

1. The Field of the Invention

The present invention relates to information management. More particularly, embodiments of the invention relate to systems and methods for classifying structured and/or unstructured data in a computer system.

2. The Relevant Technology

The world is slowly and continually moving from being paper-based to being electronic-based. Businesses have replaced bulky paper files and expensive storage rooms with electronic files and searchable databases. Tax-payers are encouraged to submit returns electronically rather than in paper form, and email is rapidly becoming the principal form of communication.

There are several reasons for this transition, one of which is the convenience and accessibility of electronic systems. Email, for example, often arrives shortly after sending it, and information submitted electronically can be quickly formatted, processed, and stored without the inconvenience of manually reviewing each submission by hand. Software programs enable documents, spreadsheets, diagrams, circuits, drawings, etc, to be created, stored, edited, accessed, etc., electronically.

One of the results of the digital nature of data is that most entities today have a large amount of data. New data is being added daily, existing data is often changed, and some data simply ages. And, as entities become more dependent on electronic data, the ability to manage electronic data becomes important for a variety of different reasons. Data security, data backup, data retention, data access control, regulatory compliance, corporate compliance, and the like are examples of why the ability to manage electronic data is important. Further, much of the electronic data maintained by an entity or organization often relates to different aspects of the entity and is often subject to various considerations. Without an effective way to manage the electronic data, it is difficult to apply the appropriate considerations to the data. As a result, providing adequate services in today's data environments is complex.

In addition to these concerns, there is often a large amount of unstructured data, meaning that the value of the data to the entity is not readily known. Consequently, the services required to manage the data are similarly unknown. For example, an entity may have a file storage system that is regularly backed up, despite the presence of files on the system that have little or no value to the entity. Thus, without an effective way to sort, classify, and maintain the data including files, the entity typically pays for unneeded services and/or has data that receives inadequate services.

Because many data systems are inadequately classified, it is difficult to ensure that the appropriate services are being applied. In fact, even when one attempts to classify data, decisions on how to manage the data are complicated by limitations based on the organization of the entity, irrespective of the data. For example, any given entity typically has more than one "line of business." An engineering firm, for example, mainly involved with contract work for the government, often has data that is associated with the actual engineering work being performed. At the same time, the firm may also have data associated with the legal department, human resources, or other administrative aspect of the firm. While some data may belong exclusively to one line of business, other data may be shared between more than one line of business. Some of the data associated with the engineering work, for example, may have legal implications, making it necessary for both lines of business to have access for the data. In other words, a given entity often has various domains of data or different shares of data, which may belong individually to a line of business or may be shared among the various lines of business.

Currently, information management classification systems perform a crawl or read operation as the classification system discovers and categorizes all the data in the system in order to assign appropriate service levels to each object. One disadvantage of this method, however is that the data reading process is computationally expensive and requires a large amount of processing time as each object is read, reviewed, and assigned to a category. Thus, there is a need for a system and method for classifying data that is more computationally efficient and cost effective.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1A:
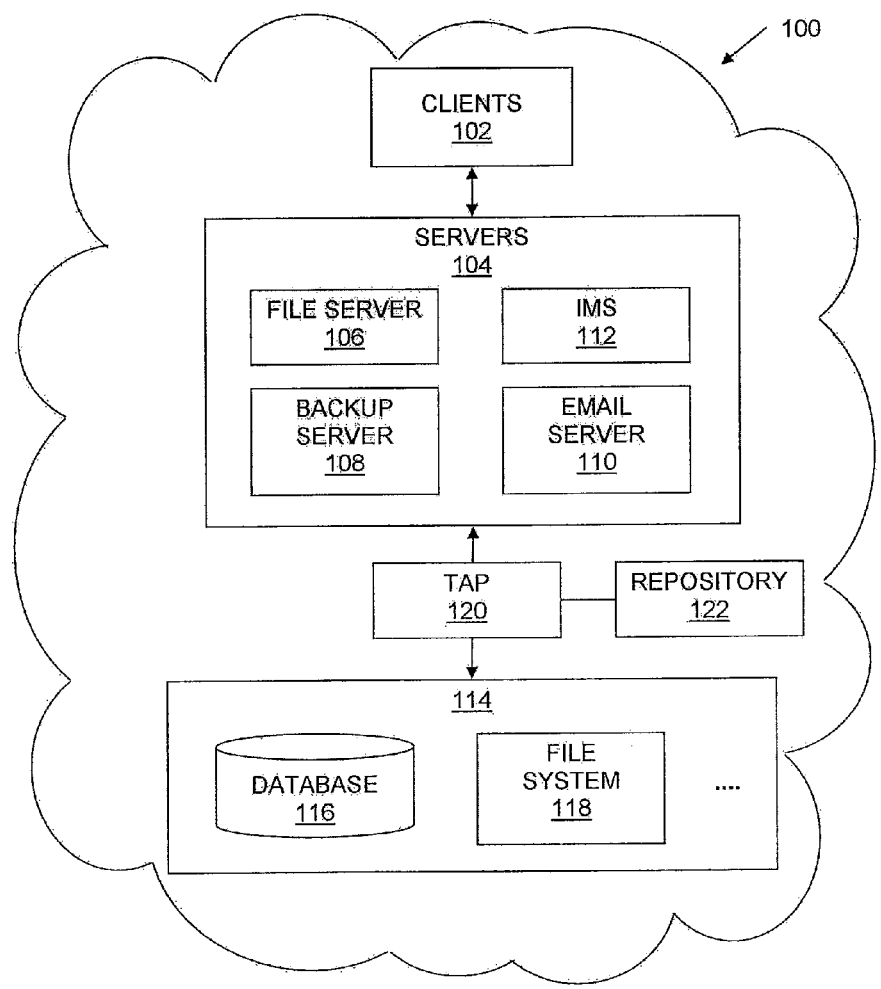
FIG. 1A illustrates one embodiment of an environment for implementing embodiments of the invention.

Embodiments of the invention relate to information or data management. Information management enables the orchestration of services such as data protection, data placement, corporate compliance, and others based on the value and/or categorization of the underlying data. Embodiments of the invention further classify objects including data in an automated fashion and provide various levels of granularity that can be adjusted as needed. Further, data management in accordance with the present invention enables services to be provided to data regardless of where or how the data is stored.

The information management and classification according to embodiments of the invention enables an entity to better ensure that its data receives the services that are required using a simple and computationally efficient system. Information management systems often offer different types of services for objects in a computing system. Information management systems can also identify services that objects, including data, require. Further, information management systems also enable entities to better evaluate the value of their data independent of services. Typically, in order for the management system to perform a requested service, it is essential for the data to be properly classified so that the system is able to accurately differentiate between data that requires service and data that does not.

Embodiments of the invention enable data, including unstructured data, to be classified in a manner that permits an entity to evaluate and review the data so that the entity may ensure that the data receives the services that it requires. In this manner, the entity may discover specific files that require services that other files do not even when they are grouped in the same file system.

Advantageously, the invention enables the information management system to classify the objects and perform other information management tasks during the routine transmission of the objects in the system. In one embodiment, a tapping device or a tapping system can be placed between two devices in the computer network or that are connected with the network. Alternatively, the tapping device or tapping system can simply have access to the network by tapping network communication lines. The tapping devices (taps) also be strategically place. For example, a tap may be placed in a location such that only specific type of data is tapped. This allows the tap to be customized to the type of data being detected and processed as described herein. For instance, the tap may be placed in front of backup storage or archival storage. This allows the data to detect the data being backed up or archived.

As a data signal is passed between the two devices or over the network, the tapping device receives the data signal or taps the data signal. Then the data is assigned to at least one category based on what is known about the data and/or what can be discovered or inferred about the data. In some instances, the results of the data classification may then be stored in a repository connected to the network tap in the computer system.

One advantage of the present invention is that it may be used without slowing or disrupting the processes of the computer system. For example, the invention may be used in association with a routine backup as data is transferred to a backup server or database. The data, for example, can be read and processed during normal operation of the network without having to perform the additional reads, or accesses normally performed by conventional information management systems.

In another embodiment of the invention, a plurality of network taps and repositories may be used in a large, scalable computer system in order to classify and manage data as it is transferred between various components of the system. According to one embodiment, the plurality of repositories connected to each network tap may then form a federated repository that may receive and respond to queries. Furthermore, the system may generate reports associated with the results of the data classification process.

As described in more detail below, information management can include discovery of the environment as well as of objects in the environment. Information management further relates to the classification of the objects and/or the environment, which enables the appropriate services to be identified, and finally to the orchestration of those services.

Often, an information management server may suffer from performance issues for various reasons, including the quantity of information or objects in a given network. In order to improve the scalability of information management, embodiments of the invention enable information management to be extended to taps that are used to tap existing data streams, such as backup data streams.

Tapping existing data streams provides several advantages to information management. For instance, information management can be performed without interrupting the primary system. In one example, the taps enable the information management system to take advantage of queries, reads, writes, etc., that occur in the normal operation of the computer network.

For example, the information management system can wait until a backup operation is performed. The network taps can then be used to collect information relating to the objects in the computer network that are included in the backup stream rather than crawling the network. Thus, the tapped data can be provided to the information management server and processed as described herein.

Alternatively, the network tap may be augmented with a repository and with information management capability or other intelligence. The tap is then able to perform information management and report the results to the information management servers. The amount of intelligence deployed to a network tap can vary. A network tap, for example, can be configured to perform discovery, classification, identify metadata, and the like or any combination thereof. These taps can perform information management or a portion thereof as described herein.

Using network taps in this manner can be extended to include a federation of taps that may include a federated repository of data. The workload of the information management server(s) is therefore reduced, which facilitates scalability of the information management system.

Information management is scalable and can be implemented in a variety of different computer or computing systems. A computer system, by way of example only, may refer to a single computer, to multiple computers (including clients and/or server computers, and other devices) that are connected with a network. The objects of a computer system can include servers, applications, services, data, file, and the like or any combination thereof.

Implementing information management in accordance with the present invention can benefit from an understanding of the computer system or of servers operating on the computer system, services operating on the computer system, and of the data (files, information, emails, etc.) that exists in or is accessible by clients, servers, and services on the computer system. This knowledge can be obtained as objects are read and classified as they are routinely transferred between various devices, servers, printers, etc., in the system. Classification is a process that enables each object to be grouped with other objects or be examined in a manner that enables the needed services for that object to be identified.

For example, all objects that need a particular service may be grouped. Alternatively, embodiments of the invention enable each object to be categorized and classified individually. As a result, the service needs of each object can be considered. Thus, the groupings identified herein are distinct from coarse groupings that fail to consider the service needs of the objects individually. An object can be any data (e.g., file), server, service, application or the like in the network. Classification typically assigns each object to one or more categories (or assigns one or more categories to each object). If available, information management enables each object to receive the services that each object requires. More common, services are typically provided in packages. As a result, the service level objects as identified by the assigned categories are often matched to the best available service package. Embodiments of the invention, however, are not so limited.

Once classification is complete, service level management may be performed using the assigned categories. Service level management provides methods for modeling/mapping the results of discovery and classification to service levels. After service levels have been identified, the various services can be orchestrated and executed. Advantageously, the services can be carried out with respect to individual objects rather than on shares or drives. As a result, an entity may only pay for the services that are actually needed rather that pay for services that may not be needed. Further, unstructured data is categorized and can be provided with the services based on its value to the entity. In one embodiment, classification is a way for an entity to automatically place a value on the various objects of data.

In another embodiment of the invention, the classification may not be followed by service level management. In some instances, the classification process may be used solely to identify data objects that meet the given set of criteria, without requiring subsequent service level management. For example, the method of classifying the data described herein may be used to identify a set of files that contain a credit card information, in order to alert an entity of the potential liability for storing unprotected files containing credit card information. In another embodiment, the classification process may be coupled with a process that automatically copies any data that has been identified during the classification process to a database for further inspection. Thus, the system and method for classifying data objects discussed below may be used in conjunction with other information management processes, or as a stand-alone classification and/or indexing process that may notify an entity of potential data management problems in the computer system.

Information management is also a process that can be ongoing. In most computer systems, objects are continually added and those objects typically require certain services. In addition to new objects, many objects also have a lifecycle associated with them. As a result, the status or need for services for certain objects can change over time. Information management incorporates lifecycle aspects such that data that grows old or stale can have the various services changed as needed.

Also, embodiments of the invention include reports, auditing, gap analysis, and the like to ensure that the services being provided are adequate. This protective ability ensures, for example, that a company complies with any applicable rule or regulation. The detection of a gap in service, for example, can lead to a change in service levels.

I. Exemplary Environment

FIG. 1A illustrates an exemplary environment for implementing embodiments of the invention. FIG. 1A is intended to illustrate that, while many systems often have similar functions, the actual implementation from one network to the next can vary significantly. The variability in network configurations is one of the aspects that may have hindered conventional attempts at information management. The variability may be related, for example, to the type of software installed, the hardware selected for the network, the configuration of the hardware/software and the like. As previously described, this is one of the reasons that discovery of a computer system may not be limited to the objects in the computer system but may also include the discovery of the servers and services that are operating in the computer system. An understanding of the servers, applications, and services in a computer system can improve the ease and accuracy with which objects are classified.

In this example, the system 100 includes a network such as a local area network, a wide area network, and the like or any combination thereof. The connections in the system 100 can be wired and/or wireless. In this case, the computer system 100 typically includes clients 102 that have access to various servers 104 and to data 114. Various services and/or applications are typically provide by the servers 104 and, in some embodiments, access to some or all of the data 114 is controlled by the various servers 104. Some of the data 114 (e.g., backed up data) is not necessarily available to the clients 102.

Examples of the servers 104 may include a file server 106, an email server 110, a backup server 108, and an information management server 112 and the like or any combination thereof. Each of the servers 104 resides in or is accessible over the computer system 100. The data 114 may include file storage 118, a database 116, and the like. The file storage 118 and database can be implemented in various ways using different software, different configurations, and the like. The hardware used to store the data 114 can include network attached storage (NAS) systems, and any other system known to one of skill in the art.

The computer system 100 includes a network tap 120 that may be used in association with the present invention. In this configuration, the network tap 120 is placed between the servers 104 and the data 114 or in another location of the network. As understood by one of ordinary skill in the art, a network tap 120 is a device that is capable of accessing the data flowing across a computer network. In some configurations, network taps are used to detect network intrusions, protocol analysis, error detection, or for other monitoring or collecting purposes. In this configuration, the network tap 120 detects or collects objects flowing through the network, collects information about the objects, and/or assigns the objects to one or more categories based on the collected information, as more fully discussed below.

The network tap 120 may cooperate with the IMS 112. In one embodiment, the network tap 120 is also connected to a repository 122 capable of storing data associated with the classification of objects transferred or detected, or collected through the network tap 120. The network tap 120 also represents a system of federated taps that may be connected at various points in the system 100. Federated taps 120 can work together to assist in the performance of information management as described herein.

Figure 1B:
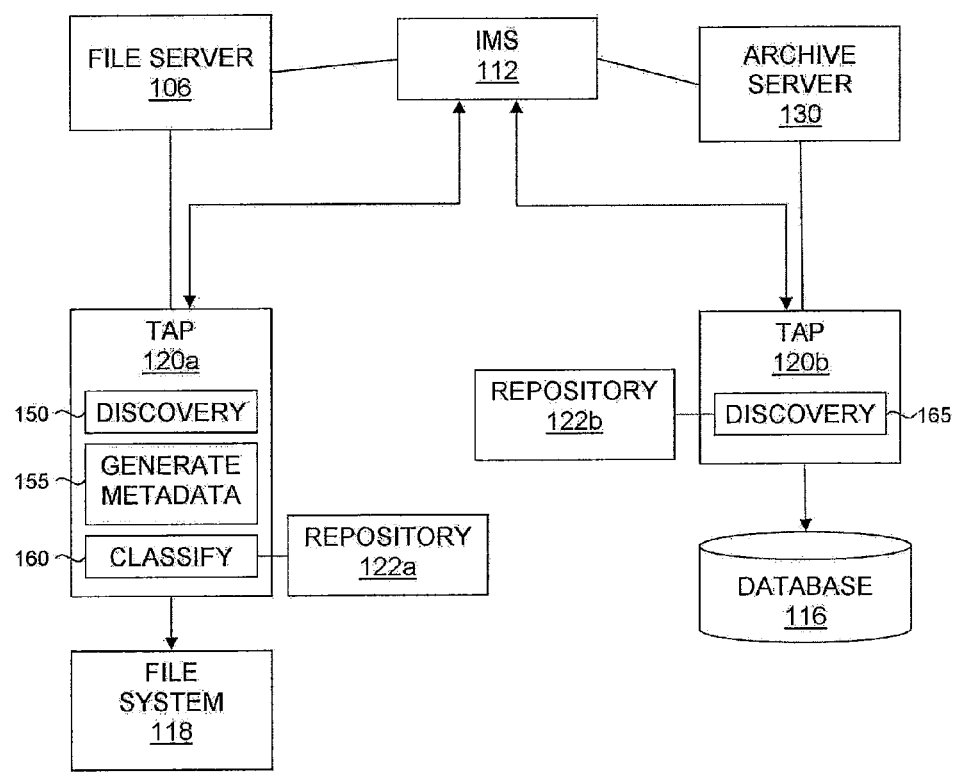
FIG. 1B illustrates another embodiment of an environment for implementing embodiments of the invention using a plurality of network taps.

FIG. 1B illustrates a second exemplary environment for implementing embodiments of the invention wherein a plurality of network taps 120a and 120b may be distributed within the computer system to perform information management services on various data streams in the system. In this example, the information management server 112 is connected to a file server 106 and an archive server 130. The file server 106 is connected to a file system 118 and the archive server 130 is connected to a database 116. In this example, the taps 120a and 120b can be viewed as federated taps.

As briefly mentioned above, one aspect of the invention is a scalable information management system that may be implemented by placing a series of network taps 120a and 120b on various data streams within the system. Advantageously, this provides an efficient and cost effective information management solution by allowing an entity to utilize as many or as few network taps as necessary to meet the specific demands of the computer system. Here, a first network tap 120a is placed so as to monitor the data stream between the file server 106 and the file system and a second tap 120b is placed so as to monitor the data stream between the archive server 130 and the database 116. In this example, both the network taps 120a and 120b are connected to a single information management server 112. Here, the information management server 112 is shown as a stand-alone system, but as may be understood by those of ordinary skill in the art, in other configurations, either or both of the network taps 120a or 120b may be integrated or combined with the information management server 112. Further, a given system may include more tan one IMS server.

As previously mentioned, one aspect of the invention is the ability to augment the network taps 120a and 120b with repositories and/or information management aspects or intelligence. Here, the first network tap 120a is capable of locally discovering objects 150, generating metadata 155, and classifying the objects 160. Conversely, the second network tap 120b has been augmented with only the capability to discover objects 165. In other words, the tap 120a has been provisioned with the intelligence needed to perform these aspects of information management. In addition, each tap 120a and 120b is connected to a local repository 122a and 122b, respectively, where the results of the information management may be stored and retrieved. The results can be permanently stored at the repository 122a, uploaded for further processing by the IMS 112, archived, or any combination thereof.

Various configurations of network devices and network taps may be used in association with the present invention and FIGS. 1A and 1B should in no way be seen as limiting the scope of the invention. For example, in one configuration illustrating the scalability of the present invention, a plurality of network taps and repositories may be connected to the various devices in the computing system in order to create a federated network tapping system and a federated repository which may be managed by the information management system 112. In another configuration, the network tap 120 and repository 122 may be integrated into a single component which may also include information management software and/or hardware as discussed herein. Additionally, the present invention may be integrated with and/or used in association with a protocol analyzer or other data analyzing devices.

One of skill in the art can appreciate that the clients 102, servers 104, and data 114 can be connected in a wide variety of configurations using various types of connections. Further, the software that operates on the servers 104, clients 102, and on the data 114 in some instances, may have certain properties or configurations. As previously discussed, it is this variability that can often complicate the ability to manage the information in a network.

II. Information Management in a Networked Environment

Information management according to embodiments of the invention has several components that work together to provide an understanding of the value of an entity's information. In some instances, the entity itself can provide or define some of the logic or rules that is used to classify or categorize the objects. Embodiments of the invention enable an entity to control some or all of the logic used for classification. Advantageously, this illustrates one way that embodiments of the invention enable an entity to better value its data. Objects can be classified or categorized individually using the entity's own logic. As a result, the service levels ultimately identified for that data reflect the entity's perception of the object's worth.

For example, an entity may want to retain objects that were authored by a particular person for a long time. A rule to that effect that is processed for the objects of the entity can then help classify the objects in an automated manner and the entity is assured that all objects that satisfy that requirement are receiving the appropriate services. More generally, an information management system can examine all business objectives for files, not just one at a time. For example, some of the files authored by a particular person may contain personal data on employees who have left the entity. Such files often fall under laws that require their destruction after a certain time period. Thus, some of the files authored by the person may need to be retained for a shorter length of time due to a more pressing consideration (regulations). One embodiment of information management can thus consider both the desire to retain files written by the author and consider regulations at the same time, for each object. Embodiments of information management can recognize conflicting service goals, as in this example, and then resolve the conflict. At the same time, some of the business objects may be additive. For instance, the entity may also desire to index all files written by the specific person.

Information management also reduces various risks (such as non-compliance) often associated with unstructured data. As described below, embodiments of the invention provide a system for classifying data such that the appropriate services can be provided to the entity's data. Embodiments of the invention also enables services that are required by an entity to be effectively identified and orchestrated. Examples of the services often required by entities includes backup services, retention services, corporate compliance services, regulatory compliance, data accessibility, data deletion, and the like or any combination thereof.

A. Classification in Information Management

Figure 2:
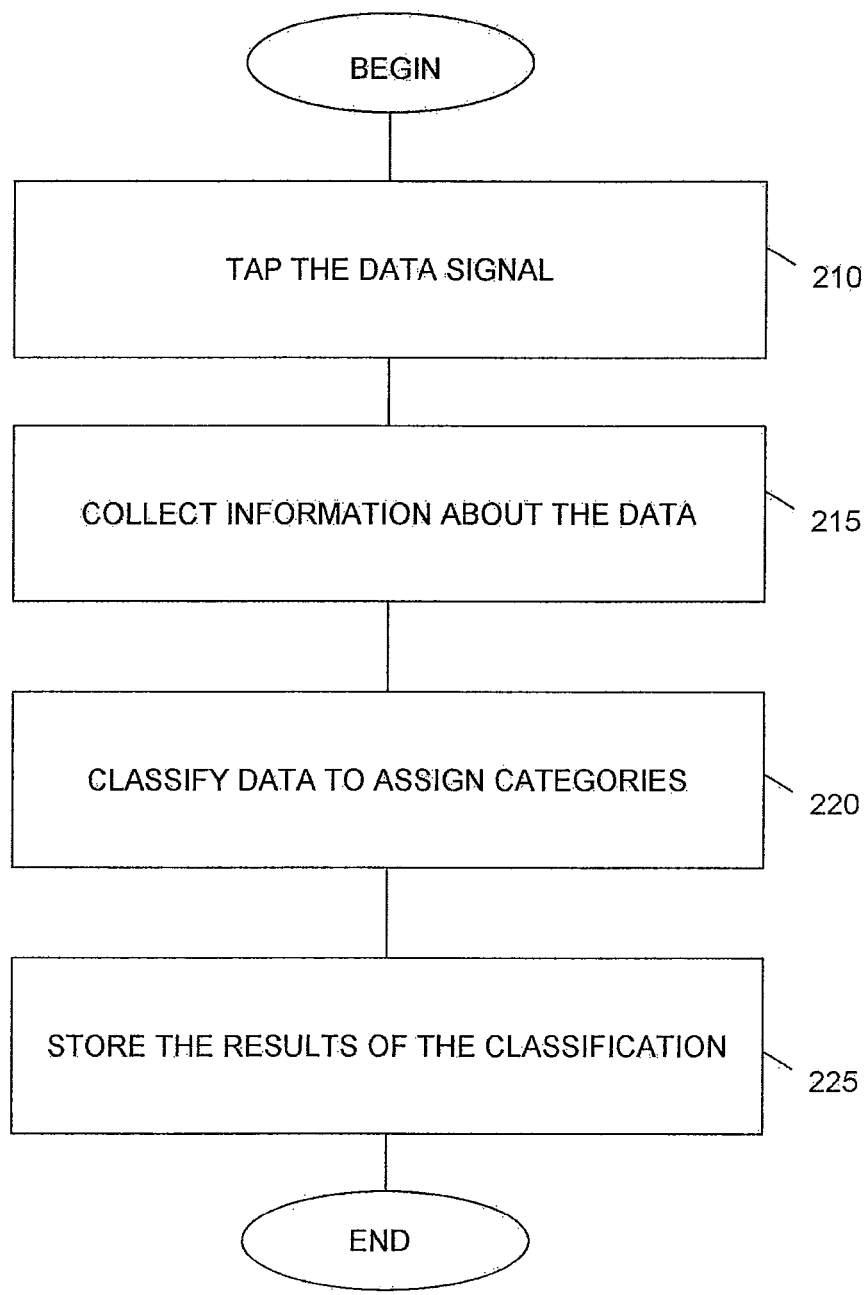
FIG. 2 illustrates a flow diagram of a method of the invention for performing information management using a tap or a system of taps.

FIG. 2 is a flow diagram illustrating a method of classifying unstructured data files or objects according to an embodiment of the invention. First, a data signal is tapped 210 using a network tap placed between two devices in the computer system. Next, information about the data is collected 215 as it passes through the network tap. Using this collected information, the data is classified 220 into categories. Then, the results of the classification are stored 225 for use in information management. These results may be used to assign service levels to the data in a larger information management scheme described below.

Figure 3:
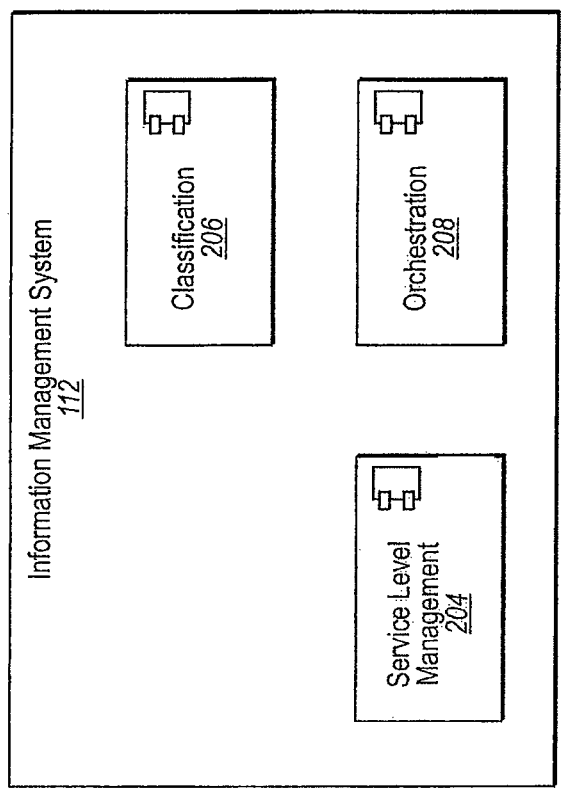
FIG. 3 illustrates one embodiment of a system and/or method for providing information management.

FIG. 3 is a flow diagram illustrating an exemplary system and method for information management of data including unstructured data files or objects. FIG. 3 provides a preliminary overview of information management, which is discussed in more detail with respect to FIGS. 4 and 5.

Classification 206 is typically performed in information management. As previously described, embodiments of the present invention use a network tap 120 in association with the information management system 112 to classify objects as they are transferred in the computing system.

Classification 206 is the process of collecting information about the data and/or of the infrastructure of a network and then identifying or associating the data or objects with categories. One result of classification is to associate objects being classified with certain categories. More particularly, the information collected during discovery 202 can be used during classification 206. The resulting categories assigned to objects in the computer system can be used in subsequent parts of information management as described below.

Classification 206, however, is not limited to the information collected during discovery. Classification 206 can also include, for example, applying sets of rules to the objects in a network. Using the network tap 120 and the repository 122, the rules can be used to categorize objects as they are transferred across the network. Information relating to the classification can be used to create an index which may be stored in the repository 122. In addition, the network and tap 120 and repository 122 may be configured to receive and respond to queries by retrieving stored classification information in the repository 122.

The classification rules can be default rules or rules that are selected according to a line of business of the entity or for any other reason. For example, objects that includes social security numbers may have to be retained for some period of time per governmental regulations. Alternatively, objects whose owner is a member of marketing may only be retained for a few years, but require full indexing.

In addition to applying rules to the objects of the entity, classification 206 may also includes the generation of metadata as well as the use of existing metadata. Generated metadata includes values that are derived from an information objects rather than having been collected by the environment. For example, hash values can be generated and then used to identify duplicate objects. Another example of generated metadata is the case where the objects are examined for specified keywords and/or patterns. This generated metadata, or metadata derived from an object being analyzed, are useful during the classification process.

Existing metadata, on the other hand, can be collected from the objects or from the environment. For example, the owner, size, share, etc., of an object can be collected and used to automatically categorize an object. The collected metadata (such as file owner) can be used by rules to categorize the content of the object or the object itself. In some embodiments, a particular object may be associated with more than one category.

In another embodiment, aging considerations can be a consideration when classifying an object. On the other hand, aging considerations can be a component of service level mapping as discussed below. The aging characteristics or other lifecycle information of a particular object may also be used during the classification process. For example, an annual report is always an annual report. However, newer annual reports may require different services than older annual reports. This aging or lifecycle consideration can be part of classification and/or it can be considered during service level mapping.

One advantage of using a network tap 120 in association with information management is that the classification process may be performed synchronously with a standard data transfer such as the routine backup of information. Such a configuration has the added benefit of utilizing the logic that exists in many backup configurations which focuses on data which is most likely to contain data that has been recently changed or is critical to an entity, as compared to other data that may remain unchanged or dormant for long periods of time. This means that the classification process may be more efficient than standard crawling systems.

As previously mentioned, the classification process may be used in association with service level management, where the classified objects are mapped to various service levels for service level orchestration. In other systems, however, the data classification may be used to identify data objects for further review without performing service level management or service level orchestration. Thus, the service level management and service level orchestration described more fully below may be used in some embodiments in association with the invention, but are not essential for the invention to be successfully performed.

B. Service Level Management in Information Management

After the objects have been categorized during classification 206, service level objectives can then be identified for the various objects. A category can be mapped through configuration data to one or more service level objectives. A category can also be mapped to a lifecycle, each of whose stages may have different service level objectives. There may be several categories involved in the analysis of a single information object, resulting in a variety of service level objectives or possibly conflicting service level objectives. Information management can also resolve conflicts, for example, using user supplied logic.

In other words, the classification process may assign categories to each of the objects. During the classification process, some of the various categories are assigned to each object as applicable. These categories can then be used to identify the service level objectives that may apply to the various objects. The discovery, for example, may have identified a particular object as an annual report and the classification of the annual report assigned a category of business critical. The information management system may be configured to map annual reports to lifecycle L1. If the object in question has aged enough to be in the second stage of that lifecycle, then a service level objective for that stage may dictate that the file needs to be retained for a specific period of time. Alternatively, the classification of the object may also indicate that the object should be retained for some specified period of time.

In this manner, the object that has been classified is then processed (using the assigned categories and/or lifecycle information) to identify the various service level objectives that should apply to the object. The service level objectives can then be bundled together into a target bundle that collectively represents the service level objectives that are desired for the object. Next, service level mapping includes matching the target bundle of services with service packages that are actually provided from service providers. If the service level objectives do not match or are not satisfied by the best matching actual service package, then a service gap may be present.

The use of packages is often used by some entities that manage some or all of their services by restricting the offerings to a number of supported combinations of service levels. In other words, the particular combination of service level objects may not represent a supported package (also referred to herein as a service bundle). Embodiments of the invention contemplate logic that is used to find a suitable service package that is close enough to what the object needs. The information management system may be able to report that no existing service bundle or service package was sufficient.

C. Service Orchestration in Information Management

In information management, orchestration is the process by which the services are orchestrated. Orchestration can automate multiple service actions and translate and end user service level request to provider action. The workflow needed to execute the services are coordinated during orchestration.

III. Information Management

Figure 4:
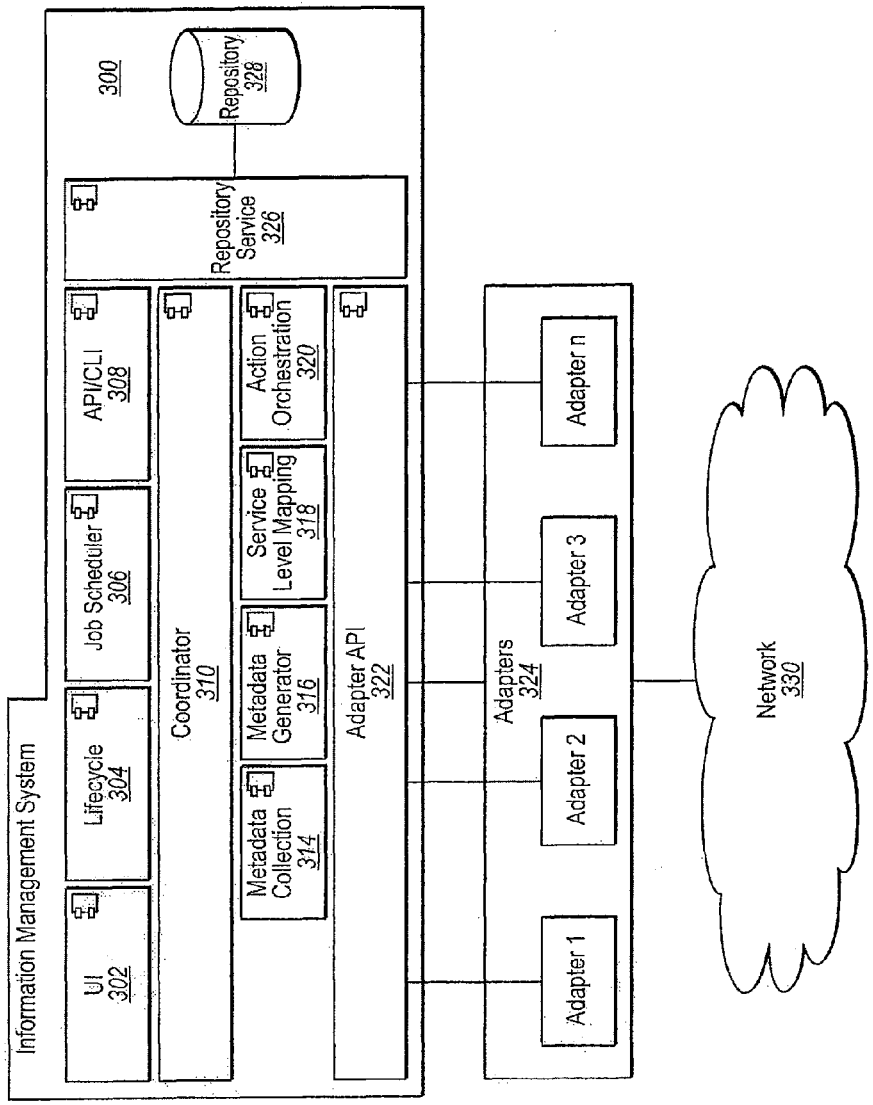
FIG. 4 illustrates a flow diagram for one embodiment of a method for providing classifying information.

FIG. 4 illustrates one embodiment of an architecture for information management. This embodiment of information management uses adapters to interface with a computer system. By using adapters, the information management system 300 provides scalability and adaptability as the computer system configuration changes over time.

As previously mentioned, in one embodiment, the logic of the information management system may be integrated with the network tap and/or repository. Thus, portions or the entirety of the information management system 300 may be integrated with the network tap 120.

In this example, the system 300 includes an adapter API 322 that interfaces with a plurality of adapters 324. The adapters 324 are used by the information management system 300 to interface with network. Information management 300 uses adapters 324 discover the objects (data, files, information, etc.) of the network as they pass through the network tap 120, for classification of the data, and/or for action orchestration. The adapters 324 can also be used to discover objects directly.

The adapters 324 can each be specifically prepared to enable the information management system 300 to interface and interact with various aspects of the network. For example, one adapter may enable the system 300 to identify and specific types of files or programs. Another adapter may enable the system 300 to examine or watch the network in order to discover applications. Adapters 324 can be used in metadata generation, by service orchestration to talk with various components about provided servers. Adapters 324 may also be used to deliver the services.

For example, if a particular NAS has its own adapter, that adapter can typically collect more information than what can be collected by a generic adapter. The specific adapter can take advantage of features in the NAS that are not necessarily available to other adapters. As more information is discovered or collected, the information management 300 can perform better classification, enable the data to be better evaluated, and assign more appropriate service level objectives. One of skill in the art can appreciate that many different adapters are possible. The adapters 324 can be used by each aspect of the system 300.

The system 300 includes an adapter manager 322 (an API in one embodiment) that provides an interface between the adapters 324 and the system 300. The adapter manager 322 can abstract the interface between the system 300 and the adapters 324 such that adapters can easily be accommodated by the system 300.

The classification portion of this example includes metadata collection 314 and metadata generation 316. The metadata collection 314 portion begins to collect metadata and other information about the infrastructure and the objects. This can be performed, for example, by queries through the various adapters 324. Examples of metadata include size, owner, path, line of business, creation date, or any other information that can be collected using an adapter or information that may be provided about the data or device.

Metadata can also be generated during metadata generation 316. For example, metadata generation may use adapters to generate hash files, look for patterns or key works in objects, and the like. The generated metadata generates additional metadata that can be used to classify the data. In this example, the discovery of an object can cascade as additional information is discovered. For example, metadata generation may begin by looking at the metadata of an object to see if the object merits further processing. Binary files, for example, may not include any data that is useful in the context of later rules. Thus, the rules may be ignored for certain objects. Next, hash rules may be applied, for example to look for duplicate objects. Metadata generation may also use computer information service rules to look for certain key words, patterns, etc., in an object. Classifier rules, can also be used during this process. For example, classifier rules tell how to assign categories to an object (e.g., an object with a social security number is categorized as a HIPPA file). Once generated, the assigned categories are another example of metadata. Often, the logic or rules used to classify or categorize an object are defined by the entity. Alternatively, the logic or rules of an entity can augment standard categorization rules. Finally, category assignment rules are executed that assign the data or objects to one or more categories.

Once the categories have been assigned to the various objects, the coordinator 310 may then initiate service level mapping 318. Service level mapping includes identifying service level objectives from the assigned categories of the objects. The desired services are then mapped to services that are actually available. For example, a service provider that offers backup, retention, and other services often offers service packages, but does not typically offer packages that specifically cover every potential need or variation of service. As a result, service level mapping is the process of identifying the best fit based on the service level objectives of an object and the offered service packages. One of skill in the art can appreciate that embodiments of the invention could identify the exact services required for each object, but may be limited by the services that are actually available. As a result, service level mapping includes the process of mapping the services level objectives to available services from the service providers. This process may also identify gaps in service. For example, none of the service packages available satisfy the service level requirements of an object, resulting in a service gap.

Next, the coordinator 310 may provide or initiates action orchestration 320. Action orchestration 320 is the process by which the selected services in the service levels can be delivered. In one example, the action orchestration submits a proposal to orchestration adapters. The adapters report their ability to satisfy the proposal of the action orchestration 320 at specified locations. The action orchestration 320 then selects the best location and adapter set to satisfy the service requirements of the data. The actions may then be performed.

In another embodiment, action orchestration 320 is not performed or is postponed. It is useful to identify what information management can achieve in a given computer system before actually performing or orchestrating the services. Thus, reports can be generated to provide a preview of what may be orchestrated.

The information management system includes a repository service 326 that has access to a database 326. In one embodiment, the database 328 is used to store infoobjects, which are objects used to record the processing state of data in the network and to record specific information. The infoobject can be persisted for state information and can support dynamic properties. For example, as new objects are discovered or additional classification information is found or accumulated, this information can be recorded and stored in the infoobject. For example, an infoobject may include the categories assigned for data particular object. These categories, as described above, can then be used for service level mapping.

In another embodiment, the database 328 may be used to store an index indicating which objects have passed through the network tap 120, along with information associated with the objects such as key words, metadata, assigned categories, or other classification information. Using this index, the database 328 may be used to respond to rule-based queries.

Figure 5:
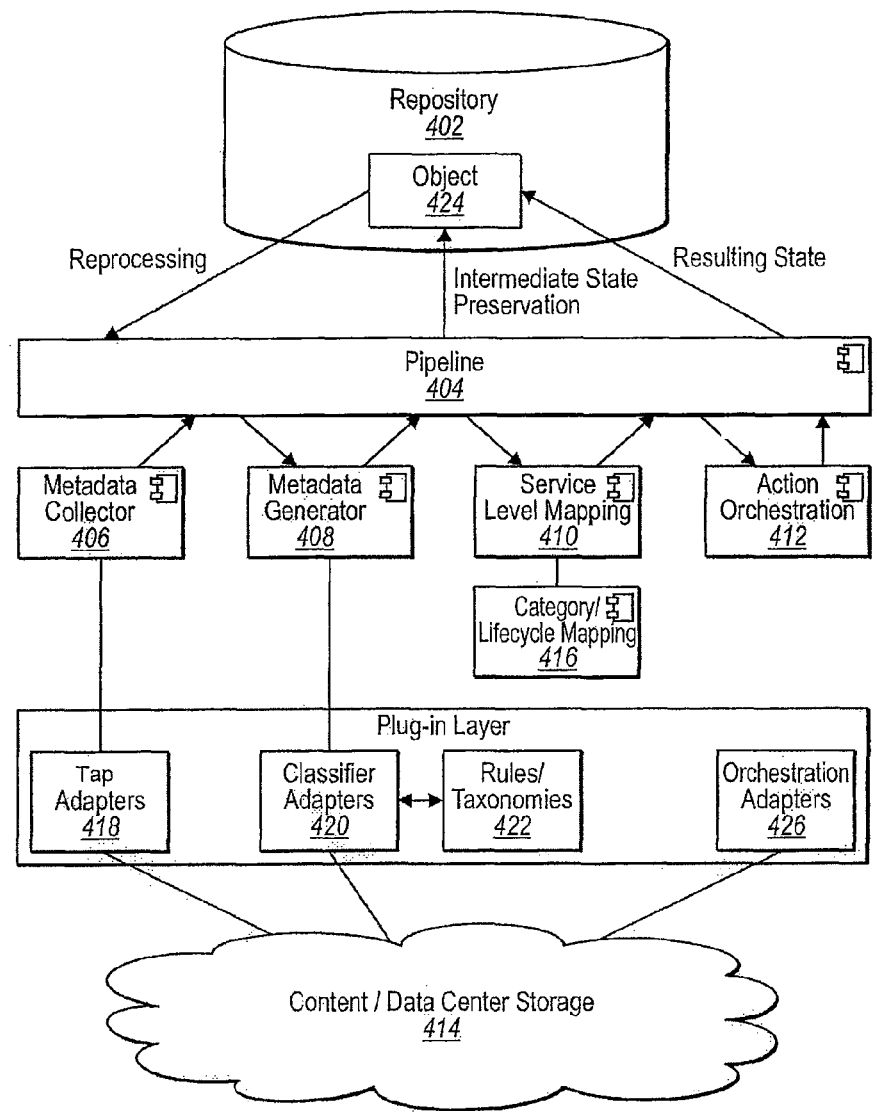
FIG. 5 illustrates an exemplary system and method for classifying or categorizing objects, such as data or content, in a computer system.

FIG. 5 is a flow diagram illustrating one embodiment of information management. In this example, information management can be viewed as a pipeline that utilizes metadata and other information associated with for each object (e.g., file, email, etc.) that may be extracted or discovered as the data passes through the network tap 120. In this example, the pipeline 404 begins in the classifier or metadata generator 408. As previously mentioned, information management can be performed by properly configured taps. Further, a tap may interact with the information management server via a tap adapter 418. For instance, categorizations, metadata, or other information discovered and/or generated during the information management process can be provided to the information management server by a tap or by a federated system of taps.

In this example, a plugin such as a classifier adapter 420 may be provided that has access to various rules or taxonomies 422 that are used to classify the various objects as described herein. The rules or taxonomies can include standard rules as well as user-defined rules (also referred to as logic). Further, the classifier 408 may also have access to the objects in the data center storage 414. For example, access may be provided to retrieve metadata, to index the file for additional metadata during metadata generation, and the like. By applying the rules or taxonomies, categories for the objects and devices in the infrastructure are identified and stored in each respective metadata 424. The repository 402 is an example of a database used by information management and stores metadata 424 for each object in the computer system.

The pipeline 404 next proceeds to service level mapping 410, which uses the categories and/or lifecycle information (which may be reflected in the assigned categories) to identify service level objects. Typically, a service level is selected at this point that satisfies the service level objects derived from the various categories assigned to the objects. Finally, the action orchestration 412 occurs to achieve a result 426. Examples of the result 426 include backup, retention, tiered storage, encryption, and the like or any combination thereof for the objects or for the various infrastructure of the network. Often, the results or action orchestration 412 may be achieved through the use of orchestration adapters 426.

As the pipeline 404 proceeds from discovery to action orchestration, there are instances where the process can begin again from discovery or from another point of the process. In this example, reprocessing of an object can occur from discovery. As any object is processed, its intermediate state is preserved in the metadata 424. Further, the resulting state can also be stored in the metadata 424. Over time, the metadata 424 can be updated, changed, deleted, and the like as necessary as the objects in the computer system change in any way.

Information management enhances the ability of a system to manage its unstructured data across domains or enhances the ability of users to manage their data including unstructured data, across varying lines of business, and by identifying services that best meet the system's or entity's requirements. As discussed above, management of service levels on information requires knowledge of the servers and systems that provide services for the information. Discovery includes the automated acquisition of this knowledge by discovering and applying classification techniques to the environment objects (servers and systems).

In addition to simply discovering and classifying the data of a network embodiments of the invention can cascade the discovery. Cascaded discovery and/or cascaded classification gathering increasingly detailed descriptions of environment data (including infrastructure, applications, services, and content) by using the results from each stage of discovery to drive the next stage. For example when an object is found to be a file server it is probed to see if it is a particular type of file server (among other choices). And if it turns out to be that type of file server, then a specific probe or adapter (including a plugin) will be used to discover firmware version and other configuration information unique to that type of file server.

Once basic information about an object is discovered it can be used to drive further levels of discovery. For example the file type, owner, location etc. can be used to decide whether to analyze the content of the file (e.g., metadata generation), which will yield more information to be used in the information management process.

As previously mentioned, grades of service offered by the environment servers are usually measured in different terms from the descriptions of services required for information. Embodiments of the invention relate further to the application of abstraction to both systems so that they can be compared and matched in a common language. This facilitates the ability of a network to more easily identify the services that are actually provided.

In a single installation the service providers are usually managed in a single uniform system for identifying service levels and relating them to environment data or objects. But the information owners are unlikely to be so uniform. Various groups (lines of business) may have very different systems for determining the business importance of information and the service levels their information needs. Embodiments of the invention provide the ability to recognize independent groupings (domains) of information owners, each of which can configure separate logic for classification and service mapping even though the service options (list of available service levels) are common to all groupings. Furthermore some of the relevant classification and service mapping logic may be common to all domains. For example when the corporate compliance officer decides how to identify files that are subject to HIPAA, the identification logic and recommended service levels should be applied to all files regardless of owner.

Service level mapping is a precise way for configuration data to guide the determination of service levels required for an information object, starting from the categories assigned to the object. This aspect of the invention describes mappings with priorities, lifecycle stages, and user-selectable strategies for selecting appropriate service bundles.

One aspect of orchestration enables users or customers to perform queries or searches by indexing the data. However, building indexes can consume significant resources. Advantageously, information management allows the user to use the concepts (classification, service mapping) described herein to select which information gets indexed. Information management enables indexing to be provided as a service and the service is selected according to the output of the service level mapping.

Conventionally, information management treats each service as a one-dimensional concept, often a simple list of service levels. Embodiments of the invention provide some service areas that are multi-dimensional: several independent decisions must be made to determine the service level needs of each information object. In effect some service areas are groupings of other subordinate service areas.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a networked computer system where data objects are transferred in the networked computer system in data signals over network infrastructure, a method for classifying and managing the data objects stored in the computer system, the method comprising:

tapping a data signal in the computer system using a tapping device connected to the network, the tapping device connected with an information management server configured to provide information management in the networked computer system, wherein the data signals in the computer system, including the data signal, transmit the data objects between devices in the computer system during operation of the computer network;

collecting information about the data objects transmitted in the data signal with the tapping device without disrupting operation of the computer system during routine transmission of the data objects in the computer system by the data signals, wherein the collected information is collected by the information management server using the tapping device;

storing the collected information, by the information management server, in a repository associated with the information management server;

classifying, by the information management server, the data objects stored in the computer system to assign categories to the data objects based on the collected information about the data objects, wherein the categories are stored by the information management server wherein the information management system differentiates between data objects that require services and data objects that do not require services based on the categories assigned to the data objects;

storing, by the information management server, the results of the classification in the repository, wherein the information management server identifies services for each of the data objects stored in the computer system using the results of the classification including the categories assigned to the data objects; and orchestrating, by the information management server, the services for each of the data objects stored in the computer system according to the results of the classification.

2. The method of claim 1, wherein collecting information about the data objects included in the data signal comprises collecting information about the content and/or the metadata of the data objects.

3. The method of claim 1, wherein classifying the data objects to assign categories to the data objects further comprises applying rules to each data object, wherein the rules use the content of the data object and/or metadata associated with the data object.

4. The method of claim 3, further comprising generating additional metadata regarding each data object such that the additional metadata is used during classification of the data object.

5. The method of claim 4, wherein generating additional metadata includes indexing each relevant data object.

6. The method of claim 1, further comprising mapping the categories assigned to each object to service level objectives to select service levels that include one or more services and orchestrating the one or more services.

7. The method of claim 3, further comprising applying rules that include an analysis of the content of the data object or the metadata associated with the data object to assign the categories to the data object.

8. The method of claim 3, wherein the rules include one or more of hash rules, content analyzer rules, and classifier rules.

9. The method of claim 1, wherein tapping a data signal further comprises at least one of:
   tapping a data signal to a backup server;
   tapping a data signal to an archive server;
   tapping a data signal to a file server;
   tapping a signal to a database; or
   tapping a signal to a storage system.

10. An information management system including an information management server for classifying and managing data objects stored in a networked computer system, the system comprising:

a tapping device capable of tapping a data signal in the networked computer system, wherein the data signal is transmitted between two devices in a networked computer system, wherein the data signal includes data objects being transmitted between the two devices and wherein the data objects transmitted in the data signal are stored in the networked computer system;

a tap adapter that communicates with the tapping device; and wherein the information management server is capable of collecting information about the data objects transmitted in the tapped data signal and classifying the data objects to assign categories to each of the data objects based on the collected information about the data object, wherein the information management server collects the information by tapping the data signal during transmission of the data objects within the computer network in the data signal, wherein the collected information is stored in a repository associated with the information management server and the data objects are stored in the networked computer system, wherein the information management server identifies services for each of the data objects stored in the networked computer system according to the categories assigned to the data objects, wherein the information management provided by the information management server differentiates between data objects that require services and data objects that do not requires the services based on the assigned categories, wherein the information management server differentiates between the services provided to the data objects stored in the networked computer system such that data objects stored in the networked computer system receive services according to their corresponding assigned categories.

11. The system of claim 10, wherein the repository is capable of storing the results of the data classification, wherein the repository is connected to either the tapping device or the information management server.

12. The system of claim 10, further comprising a plurality of tapping devices that act as a federation to perform information management functions on data objects included in data signals transmitted in the networked computer system.

13. The system of claim 10, wherein the information management server delegates intelligence to the tapping device and an associated repository such that the tapping device performs at least one of discovery of data objects, classification of data objects, and service level mapping, wherein result generated by the tapping device are transmitted to the information management server.

14. In a networked computer system, a method for classifying and managing data objects stored in the networked computer system, the method comprising:

using a plurality of tapping devices to tap a plurality of data signals in the computer system, the plurality of tapping devices connected with an information management server configured to provide information management for the data objects in the networked computer system, the plurality of tapping devices connected to the networked computer system in a manner to tap the data signals transmitted in the networked computer system, wherein the data objects transmitted in the data signals are stored in storage in the networked computer system;

collecting information about the data objects included in the plurality of data signals using the plurality of tapping devices without disrupting transmission of the data signals in the networked computer system;

storing the collected information in a plurality of repositories associated with the information management server such that the collected information is independent of the data objects;

classifying the data objects to assign categories to the data objects based on the collected information, the categories stored by the information management server in the plurality of repositories; and storing the results of the classification in the plurality of repositories connected to the plurality of tapping devices, wherein the information management server identifies services for each of the data objects stored in the networked computer system using the results of the classification including the categories assigned to the data objects, wherein the information management provided by the information management server differentiates between data objects that require services and data objects that do not requires the services based on the results of the classification including the assigned categories, wherein the information management server differentiates between services provided to the data objects stored in the networked computer system such that data objects receive services according to their corresponding assigned categories.

15. The method of claim 14, wherein collecting information about the data objects in the data signals comprises collecting information about the content or the metadata of the data objects.

16. The method of claim 14, wherein classifying the object to assign categories to each object further comprises:

applying rules to each data object, wherein the rules use the content of the data object or the metadata associated with the data object;

generating additional metadata regarding each data object such that the additional metadata is used during classification of the data object; and applying rules that include an analysis of the content or metadata of the data object, wherein the rules include one or more of hash rules, content analyzer rules, and classifier rules; and assigning one or more categories to each data object.

17. The method of claim 14, further comprising delegating a portion of information management classification to at least one of the plurality of tapping devices, wherein the delegated portion of information management includes at least one of discovery, classification, and service level mapping, wherein results of the portion of information management are returned to an information management server.

18. The method of claim 14, further comprising mapping the categories assigned to each object to service level objectives to select service levels that include one or more services and orchestrating the one or more services.

19. The method of claim 11, wherein the plurality of repositories connected to the tapping devices are connected to the information management server and form a federated repository of stored classification results.

20. The method of claim 19, wherein the information management server generates and responds to queries by communicating with the federated repository of stored classification results.

* * * * *